(12) United States Patent
Newkirk et al.

(10) Patent No.: US 8,861,482 B2
(45) Date of Patent: *Oct. 14, 2014

(54) METHOD AND APPARATUS FOR PROVIDING APPLICATION SERVICE BETWEEN A FIRST PROTOCOL AND A SECOND PROTOCOL

(75) Inventors: Dennis R. Newkirk, Lake Barrington, IL (US); Richard J. Bitter, Schaumburg, IL (US); Leslie G. Gustafson, Oakwood Hills, IL (US); Chris A. Kruegel, Plainfield, IL (US); Obaid Shahab, Lombard, IL (US); Ryan P. Ziolko, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 918 days.

This patent is subject to a terminal disclaimer.

(21) Appl. No.: 12/570,835

(22) Filed: Sep. 30, 2009

(65) Prior Publication Data

US 2011/0075614 A1   Mar. 31, 2011

(51) Int. Cl.
| | | |
|---|---|---|
| *H04W 80/00* | (2009.01) | |
| *H04W 84/00* | (2009.01) | |
| *H04J 3/24* | (2006.01) | |
| *H04L 29/06* | (2006.01) | |
| *H04W 12/04* | (2009.01) | |
| *H04B 7/216* | (2006.01) | |
| *H04W 84/08* | (2009.01) | |

(52) U.S. Cl.
CPC ............. *H04W 12/04* (2013.01); *H04W 84/08* (2013.01); *H04L 69/18* (2013.01); *H04L 69/08* (2013.01)
USPC ........................................................ 370/335

(58) Field of Classification Search
CPC ................................................... H04W 12/04
USPC .................................. 370/329, 466, 474, 335
See application file for complete search history.

(56) References Cited

U.S. PATENT DOCUMENTS 5,521,963 A * 5/1996 Shrader et al. ................ 455/437
5,706,286 A * 1/1998 Reiman et al. ................ 370/401

(Continued)

FOREIGN PATENT DOCUMENTS

| EP | 1376924 A2 | 1/2004 |
|---|---|---|
| WO | 2008047231 A | 4/2008 |
| WO | 2009089908 A1 | 7/2009 |

OTHER PUBLICATIONS

Duran et al—U.S. Appl. No. 12/423,105, filed Apr. 14, 2009—Specification and Drawings—33 pages.

(Continued)

*Primary Examiner* — Brandon Renner
*Assistant Examiner* — Faisal Choudhury
(74) *Attorney, Agent, or Firm* — Barbara R. Doutre; Daniel R. Bestor

(57) ABSTRACT

Application service is provided for a subscriber unit (SU), employing a first protocol, in a communication network employing a second protocol. The method includes receiving a CAI OTAR message from the SU. The CAI OTAR message includes at least a key management message (KMM) and a CAI header of the SU. The method then includes determining that the first protocol employed by the SU is different from the second protocol associated with the communication network based on the received CAI OTAR message. The method further includes creating a key management message (KMM) preamble, associated with the second protocol, based on at least one of the CAI header and configuration information of the SU, and creating a data link independent (DLI) OTAR message associated with the second protocol. The DLI OTAR message includes the received KMM. The method finally includes encapsulating the DLI OTAR message with the created KMM preamble, and sending the encapsulated DLI OTAR message to a key management facility (KMF) unit operating at a second protocol.

24 Claims, 6 Drawing Sheets

(56) References Cited

U.S. PATENT DOCUMENTS

| | | | |
|---|---|---|---|
| 7,242,695 B2 * | 7/2007 | Sprague et al. | 370/467 |
| 7,532,640 B2 * | 5/2009 | Kelly et al. | 370/466 |
| 2005/0238009 A1 * | 10/2005 | Bell | 370/389 |
| 2007/0014287 A1 * | 1/2007 | Bouckaert et al. | 370/389 |
| 2007/0124587 A1 * | 5/2007 | Krishnamurthi et al. | 713/168 |
| 2007/0243872 A1 * | 10/2007 | Gallagher et al. | 455/436 |
| 2008/0171533 A1 * | 7/2008 | Sharp et al. | 455/410 |
| 2009/0003381 A1 * | 1/2009 | Shamilian et al. | 370/467 |
| 2009/0046726 A1 * | 2/2009 | Cabrera et al. | 370/397 |
| 2009/0049202 A1 * | 2/2009 | Pattison et al. | 709/249 |
| 2009/0232019 A1 * | 9/2009 | Gupta et al. | 370/252 |
| 2010/0325262 A1 * | 12/2010 | Allen et al. | 709/224 |

OTHER PUBLICATIONS

"Terrestrial Trunked Radio (TETRA); Direct Mode Operation (DMO); Part 6: Security; ETS 300 396-6," ETSI Standards, Sophia Antipolis Cedex, France, vol. Tetra-6, Apr. 1, 1998.

International Search Report and Written Opinion mailed on Apr. 5, 2011 for International Application No. PCT/US2010/049069.

NIST Special Publication 800-57—Recommentation for Key Management: Part 3: Application-Specific Key Management Guidance—Elaine Barker et al—pp. 1-10 and 68-69—Dec. 2009.

Elaine Barker et al—Sections 7.3 and 7.4, pp. 68-69—Recommen Dation for Key Management—Part 3: Application-Specific Key Management Guidance—NIST Special Publication 800-57, Dec. 2009.

* cited by examiner

METHOD AND APPARATUS FOR PROVIDING APPLICATION SERVICE BETWEEN A FIRST PROTOCOL AND A SECOND PROTOCOL

FIELD OF THE DISCLOSURE

The present disclosure relates generally to a communication network and more particularly to a method and apparatus for providing application service for a subscriber unit (SU), employing a first protocol, in a communication network employing a second protocol.

BACKGROUND

As the public safety market continues to require increased functionality of two-way radio, the association of public safety communications officials (APCO) through project 25 (P25) encourages participation of equipment suppliers and organizations to find solutions that meet the needs of the public safety market. In general, the APCO P25 standard specifies two approaches for providing application or centralized key management services to a subscriber unit (SU). The first approach employs common air interface (CAI) over the air rekeying (OTAR), and the second approach employs data link independent (DLI) OTAR which is also known as transport independent (TI) OTAR.

In the existing conventional systems, the subscriber units employing the CAI OTAR protocol can communicate and obtain key management application services only with an infrastructure system operating over or employing the CAI OTAR protocol. Similarly, the subscriber units employing the TI/DLI OTAR protocol can communicate and obtain key management application services only with an infrastructure system operating over or employing the TI/DLI OTAR protocol. However, migrating or moving the subscriber units employing the CAI OTAR protocol to the system or infrastructure having the DLI OTAR protocol currently requires replacement of the system's infrastructure and possibly its subscriber units. This is costly and undesirable.

In the existing technology, the challenge is that the CAI OTAR and TI/DLI OTAR based subscriber units cannot operate on the same channel or system. Other systems may face similar challenges when attempting to handle multiple protocols on the same channel or system.

Accordingly, there exists a need for providing application or OTAR services between two different standard protocols.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method, steps and components related to providing application service for a subscriber unit (SU), employing a first protocol e.g. common air interface (CAI) over the air rekeying (OTAR), in a communication network employing a second protocol e.g. data link independent (DLI) OTAR. The method includes receiving a CAI OTAR message from the SU. The CAI OTAR message includes at least a key management message (KMM) and a CAI header of the SU. The method then includes determining that the first protocol employed by the SU is different from the second protocol associated with the communication network based on at least one of the received CAI OTAR message and SU configuration information.

The method further includes creating a key management message (KMM) preamble, associated with the second protocol, based on at least one of the CAI header and configuration information of the SU, and creating a data link independent (DLI) OTAR message associated with the second protocol. The DLI OTAR message includes the received KMM.

The method finally includes encapsulating the DLI OTAR message with the created KMM preamble, and sending the encapsulated DLI OTAR message to a key management facility (KMF) unit operating at a second protocol.

Additionally, the method includes converting key management messages (KMMs) associated with the second protocol, received from the KMF unit, to KMMs associated with the first protocol for the subscriber unit.

In the same way, the method provides application service for a subscriber unit transmitting a CAI data registration request message or a CAI unable-to-decrypt message, which is explained in detail in the below description.

In the description herein, numerous specific examples are given to provide a thorough understanding of various embodiments of the invention. The examples are included for illustrative purpose only and are not intended to be exhaustive or to limit the invention in any way. It should be noted that various equivalent modifications are possible within the spirit and scope of the present invention. One skilled in the relevant art will recognize, however, that an embodiment of the invention can be practiced with or without the apparatuses, systems, assemblies, methods, components mentioned in the description.

Figure 1:
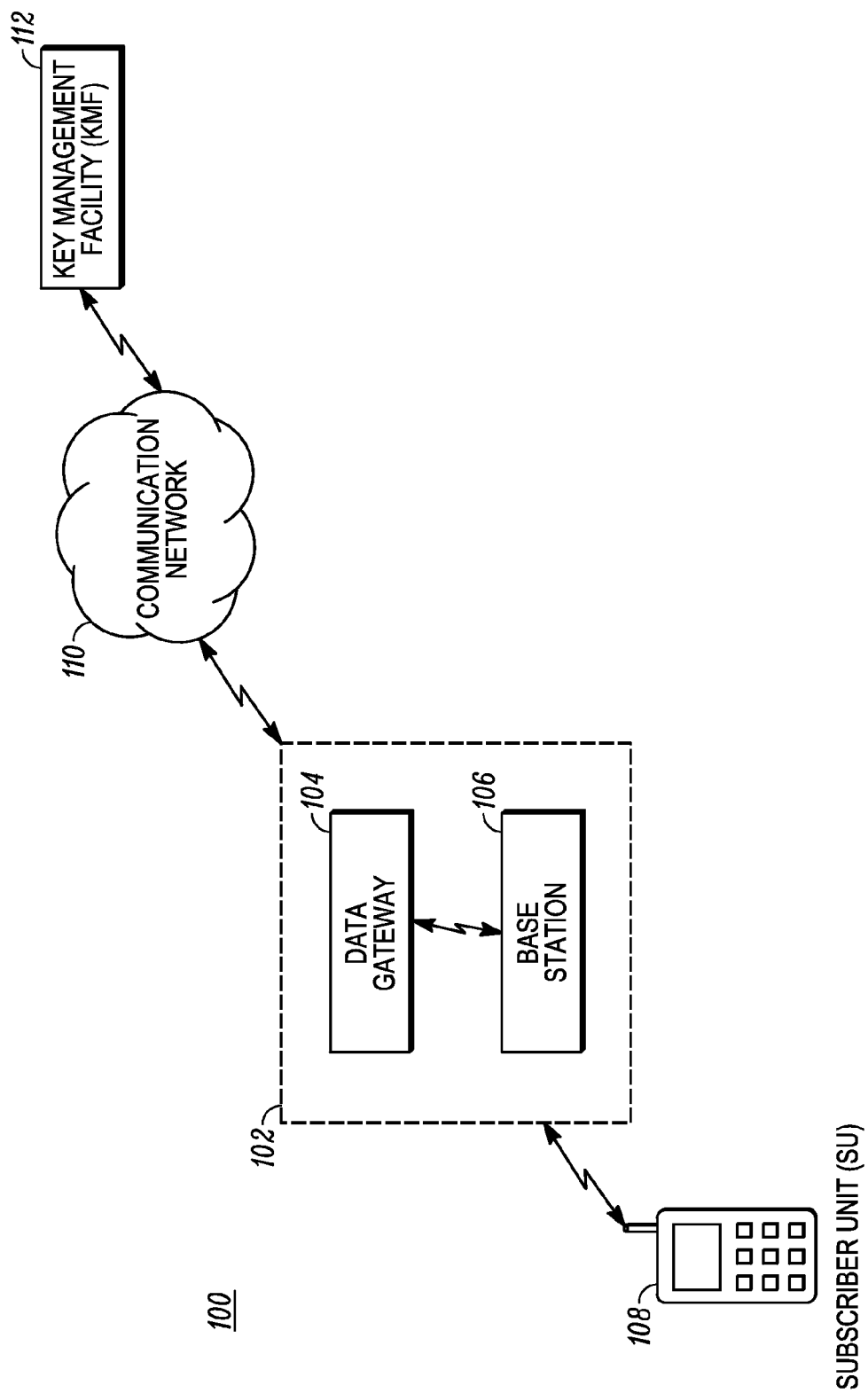
FIG. 1 is a communication system in accordance with some embodiments.

FIG. 1 illustrates a communication system 100 in accordance with some embodiments. The communication system 100 includes an APCO system 102, a subscriber unit (SU) 108, a communication network 110, and a key management facility (KMF) unit 112. It should be noted that the communication system 100 may include any number of subscriber units and KMF units, and is not limited to only one subscriber unit 108 and one KMF unit 112.

In accordance with the embodiment, the SU 108 may be a device, associated with a subscriber that employs a protocol for communicating with the communication network 110 via the APCO system 102. The protocol may be any type of communication protocol that employs common air interface operating procedures, e.g. CAI OTAR. It should be noted that the protocol employed by the SU 108 may also be referred as a first protocol in the below description.

In accordance with the embodiment, the SU 108 is configured to operate according to one of a number of different 2G, 3G and 4G wireless communication technologies. These include Global System for Mobile Communication (GSM), Code Division for Multiple Access (CDMA), Universal Mobile Telecommunication System (UMTS), Wideband Code Division for Multiple Access (W-CDMA), Orthogonal Frequency Division Multiplexing (OFDM), Worldwide Interoperability for Microwave Access (WiMax), Long-Term Evolution (LTE) and other communication technologies. The SU 108 may be a wireless device, a mobile station, user equipment, an APCO 25 radio, or any similar device that operates at a first protocol, e.g. common air interface (CAI) OTAR.

In accordance with the embodiment, the APCO system 102 is an infrastructure system that includes at least a data gateway (DG) 104 and a base station or a repeater 106. The APCO system 102 supports the first and second protocols, e.g. the CAI OTAR and TI/DLI OTAR protocols, and enables end points such as the KMF unit 112 and the SU 108 to communicate with each other. It should be noted that the CAI OTAR protocol may be referred as a first protocol, and the TI/DLI OTAR protocol may be referred as a second protocol in the below description. The APCO system 102 may serve as a translator back and forth between the protocols supported by the SU 108 and the KMF unit 112.

In accordance with the embodiment, the DG 104 is a functional entity that may include a data concentrator, a multi-protocol data manager, or a packet data gateway. The DG 104 may be responsible for supporting functions such as IP address assignment, authentication, traffic security, generating application headers, and so on. The application headers, such as a key management message (KMM) preamble, may be generated for encrypting/securing application layer messages/KMMs. The KMM preamble is also known as a KMF/KMM header attached to the application layer messages or KMM messages associated with the second protocol. It should be noted that the KMM preamble is also referred as a second protocol preamble in the below description.

In accordance with the embodiment, the DG 104 may proxy at least one of a registration message, an unable-to-decrypt message, or a key management message (KMM) received from the SU 108 associated with the first protocol. For example, the DG 104 may receive a CAI data registration request message including a CAI address (ID) from the SU 108. The received CAI ID is utilized by the DG 104 along with pre-configuration information of the SU 108 to create the KMM preamble that is associated with the second protocol. The DG 104 also creates a DLI OTAR registration message utilizing the information included in the received CAI data registration request message. The created DLI OTAR registration message includes the received CAI ID of the SU 108. The KMM preamble and the DLI OTAR registration message are created on behalf of the SU 108 associated with the first protocol.

The DG 104 further encapsulates the DLI OTAR registration message with the created KMM preamble. The encapsulated DLI OTAR registration message is then transmitted to the KMF unit 112 so that the DLI OTAR registration message appears to be associated with the second protocol. Also, the DLI OTAR registration message appears to be received from a SU 108 that the KMF unit 112 manages.

In the same way, the DG 104 may also proxy the unable-to-decrypt message or the KMM/application layer message received from the SU 108. Thus, the process of encapsulating the registration message, the unable-to-decrypt message, or the KMM with the created KMM preamble on behalf of the SU 108, and transmitting such messages to the KMF unit 112 may be referred as DLI/TI OTAR proxying. In general, the DLI/TI OTAR proxying may be employed for interfacing the end points such as the KMF unit 112 and the SU 108 operating at two different protocols.

In a similar way, the DG 104 detects KMF unit 112 generated data packets, having a KMM and a KMM preamble associated with the second protocol, which are being forwarded to the SU 108. The DG 104 removes the KMM preamble, associated with the second protocol, from the data packets, and creates a CAI header utilizing information included in the KMM preamble messages. The DG 104 then encapsulates the data packets having the KMM with the created CAI header, and transmits such encapsulated data packets to the SU 108, which appears to the SU 108 as data packets being associated with the first protocol.

Further, moving back to the components/elements of the communication system 100, the base station or repeater 106 is an entity that facilitates wireless communication between two communication devices or a network. The base station or repeater 106 is communicatively coupled between the SU 108 and the DG 104, for facilitating wireless communication between the SU 108 and the DG 104. The base station or repeater 106 may be referred as a radio base station or repeater, node B (in 3G networks), base transceiver station, repeater, comparator voting sub-site, or cell site.

In accordance with the embodiment, the KMF unit 112 is communicatively coupled to the other end of communication network 110. The KMF unit 112 may process the message or data, only if the message or data is associated with the protocol that is same as the protocol employed by the KMF unit 112. Thus, the KMF unit 112 may process the message, only after ensuring that the received message or data is from a SU 108 that it manages. It should be noted that the protocol, e.g. TI/DLI OTAR protocol, employed by the KMF unit 112 may also be referred as the second protocol in the below description.

Figure 2:
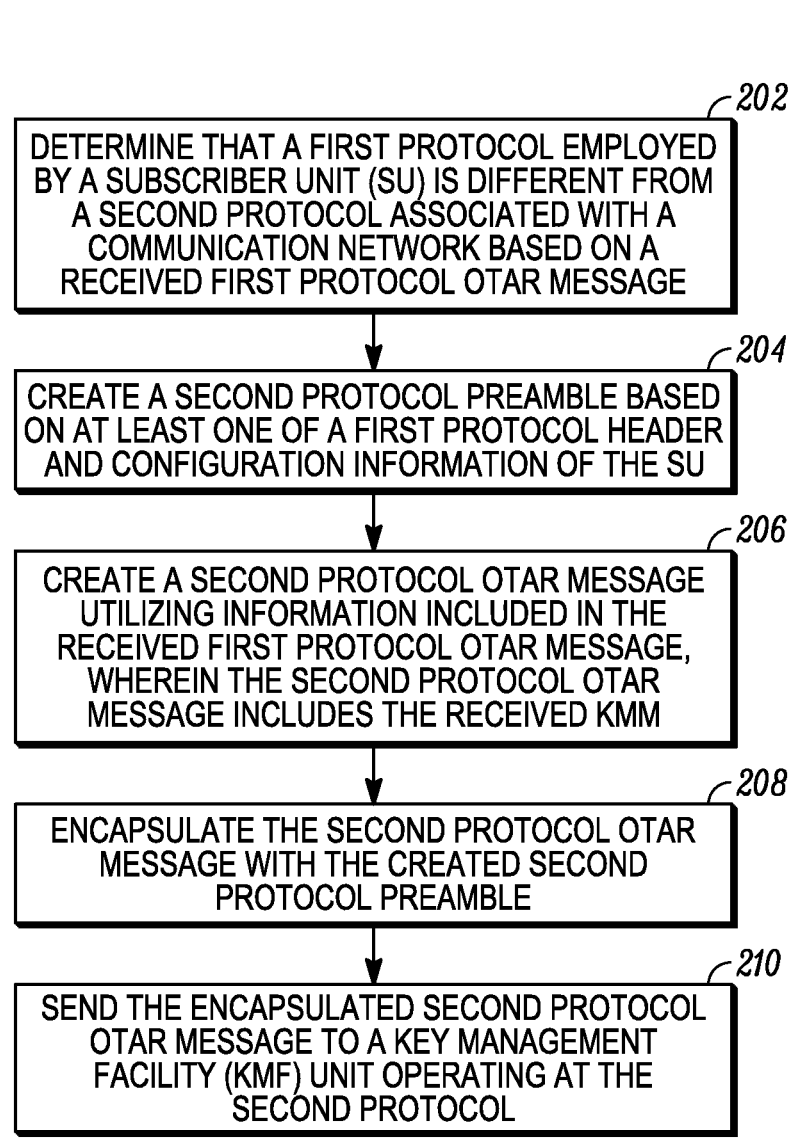
FIG. 2 is a flowchart representing a method for providing application service for a subscriber unit (SU) transmitting a CAI OTAR message in a communication network employing a DLI OTAR protocol in accordance with some embodiments.

FIG. 2 discloses a method 200 for providing application service for a subscriber unit (SU) 108, employing a first protocol, in a communication network 110 employing a second protocol. The method 200 begins with a step of determining 202 that the first protocol employed by the SU 108 is different from the second protocol associated with the communication network 110 or the KMF unit 112. The DG 104 determines that the first protocol is different from the second protocol based on a first protocol OTAR, e.g. CAI OTAR, message received from the SU 108. The first protocol OTAR message includes a KMM message and a first protocol header, e.g. CAI header of the SU 108. In another embodiment, the DG 104 determines that the protocols differ based on the information manually entered by an operator.

The method 200 then moves to step of creating 204 a second protocol preamble, e.g. KMM preamble based on at least one of a first protocol header and configuration information of the SU 108. The configuration information may include a version number representing the format or fields of the KMM preamble. The second protocol preamble is created by transferring the information included in the received first protocol header.

The method 200 then continues with a step of creating 206 a second protocol OTAR message utilizing information included in the received first protocol OTAR message. The second protocol OTAR message includes the KMM obtained from the received first protocol OTAR message.

The method 200 further continues with a step of encapsulating 208 the second protocol OTAR message, e.g. DLI OTAR message, with the created second protocol preamble e.g. KMM preamble. The encapsulated second protocol OTAR message may also be attached with user datagram protocol/transmission control protocol (UDP/TCP) and IP headers. It should be noted that for the purposes of this application the DLI OTAR message contains only the KMM and this message is encapsulated by the KMM preamble. In general, the DLI OTAR message may be referred to a message that includes both the KMM and the KMM preamble.

The method 200 then moves to a step of sending 210 the encapsulated second protocol OTAR message to a key management facility (KMF) unit 112 operating at the second protocol. Because of the attached second protocol preamble, the second protocol OTAR message appears to the KMF unit 112 as if it is associated with the second protocol. So, when the KMF unit 112 receives the encapsulated second protocol OTAR message, the KMF unit 112 considers the second protocol OTAR message to be associated with the second protocol, e.g. DLI/TI OTAR, and process the second protocol OTAR message to provide an application service requested by the SU 108.

Figure 3:
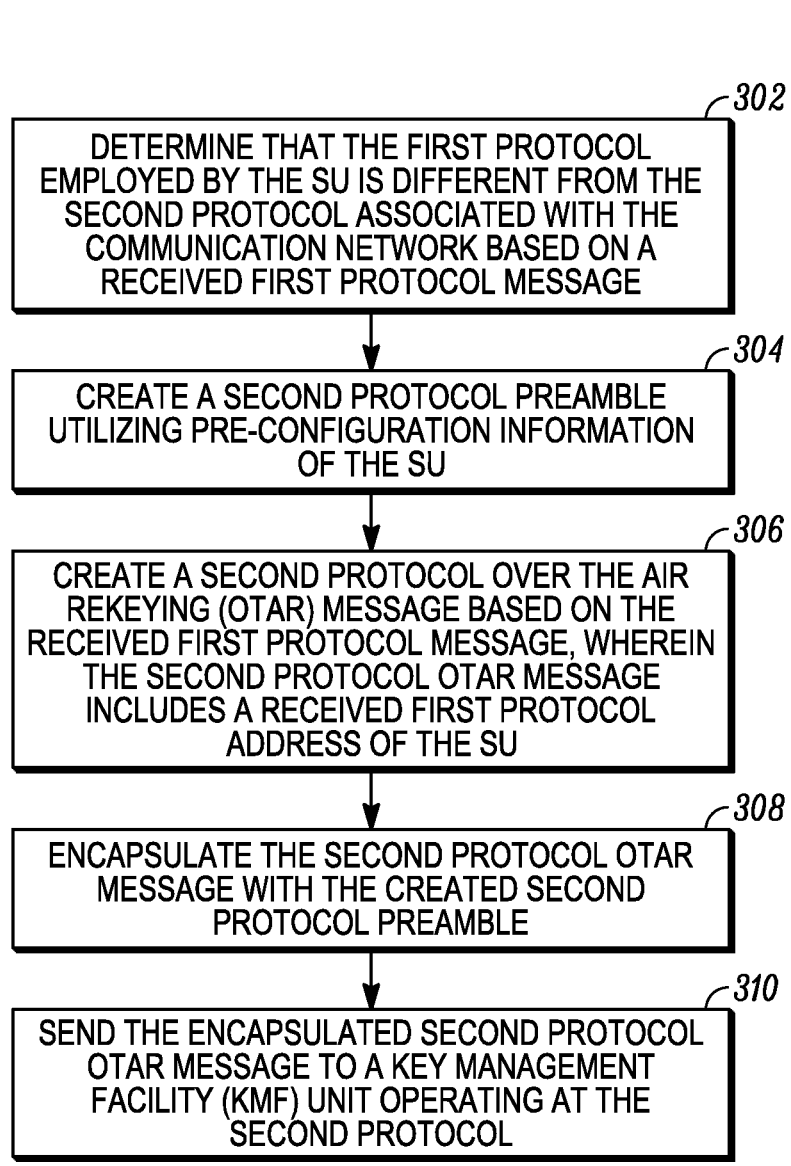
FIG. 3 is a flowchart representing a method for providing application service for a subscriber unit (SU) transmitting at least one of a CAI data registration request message and a CAI Unable-to-decrypt message in a communication network employing a DLI OTAR protocol in accordance with some embodiments.

In accordance with an embodiment, FIG. 3 discloses a method 300 for providing application service for a subscriber unit (SU) 108 that transmits at least one of a CAI data registration request message and a CAI unable-to-decrypt message data, employing a first protocol, to a communication network 110 employing a second protocol. The method 300 begins with a step of determining 302 that the first protocol employed by the SU 108 is different from the second protocol associated with the communication network 110 or the KMF unit 112. The DG 104 determines that the first protocol is different from the second protocol based on a first protocol message, e.g. CAI message, received from the SU 108. The first protocol OTAR message may be a CAI data registration request message or a CAI unable-to-decrypt message associated with the first protocol. The first protocol message may include a first protocol address, e.g. CAI ID, of the SU 108. In another embodiment, the DG 104 determines that the protocols differ based on the information manually entered by an operator.

The method 300 then moves to step of creating 304 a second protocol preamble, e.g. KMM preamble utilizing pre-configuration information of the SU 108. The pre-configuration information includes at least one of a manufacturer identity, an application key identity, message indicator, and/or an algorithm identity that is used for creating the KMM preamble/second protocol preamble. For example, the manufacturer identity may be set as MOTOROLA, the algorithm identity may be set as CLEAR, and the application key identity and the message indicator may be set as ZERO.

The method 300 then continues with a step of creating 306 a second protocol OTAR message based on the received first protocol message. The second protocol OTAR message includes the first protocol address, e.g. CAI ID, obtained from the received first protocol message. The second protocol OTAR message may be a data link independent (DLI) OTAR registration message or a DLI OTAR unable-to-decrypt message. For example, if the CAI data registration request message is received from the SU 108, the DG 104 creates the DLI OTAR registration message. Similarly, if the CAI unable-to-decrypt message is received from the SU 108, the DG 104 creates the DLI unable-to-decrypt message.

The method 300 further continues with a step of encapsulating 308 the second protocol OTAR message, e.g. DLI OTAR message, with the created second protocol preamble e.g. KMM preamble. The encapsulated second protocol OTAR message may also be attached with UDP/TCP and IP headers.

The method 300 then moves to a step of sending 310 the encapsulated second protocol OTAR message to a key management facility (KMF) unit 112 operating at the second protocol. Because of the attached second protocol preamble, the second protocol OTAR message appears to the KMF unit 112 as if it is associated with the second protocol. Also, the KMF unit 112 considers the second protocol OTAR message to be received from a SU that the KMF unit 112 manages. Thus, the DG 104 provides interface between two end points such as the SU 108 and the KMF unit 112, operating at two different protocols.

Figure 4:
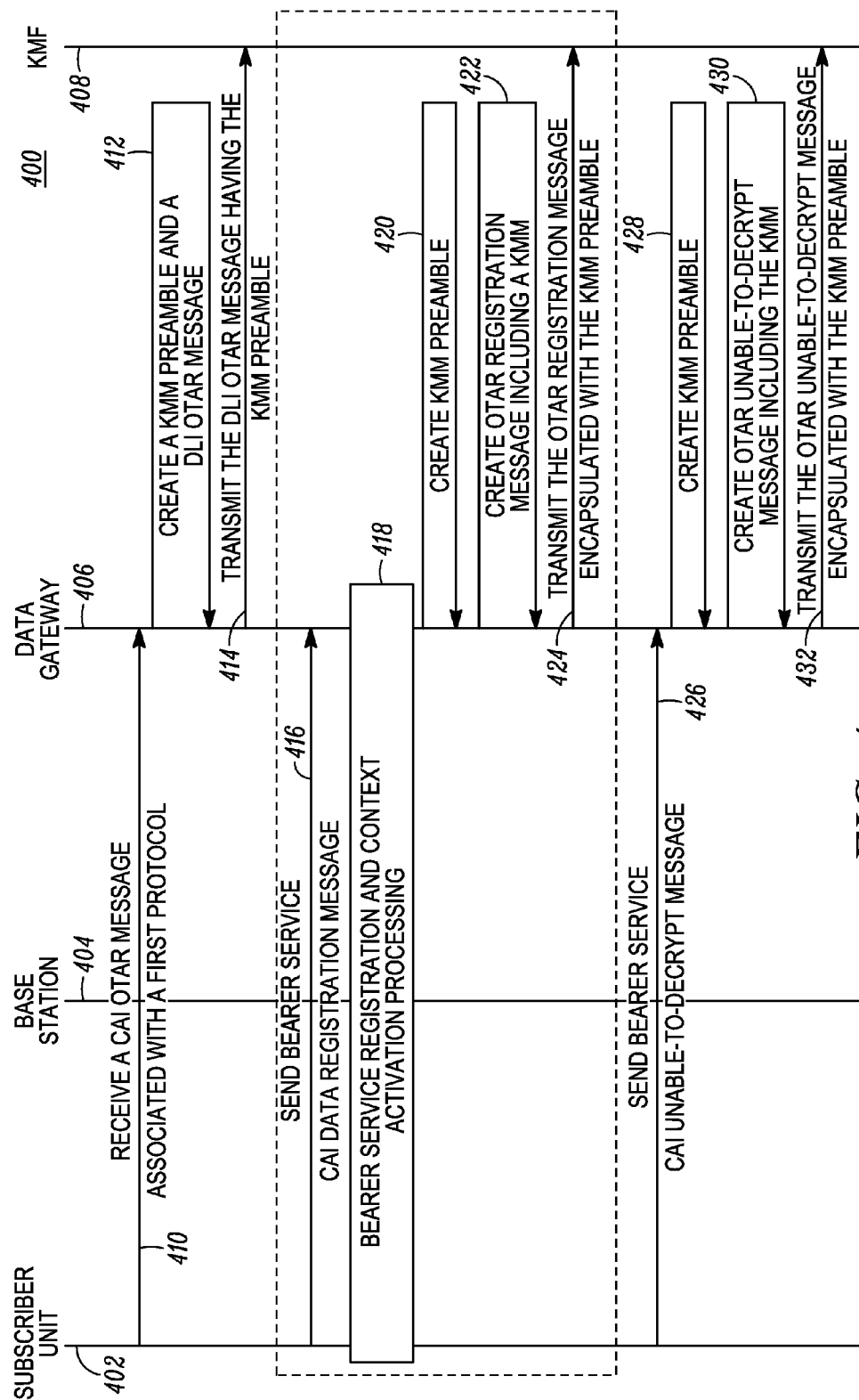
FIG. 4 is a signal flow diagram in accordance with some embodiments.

FIG. 4 discloses a signal flow diagram 400 of a method for providing application service for a subscriber unit (SU) 402, such as a mobile subscriber unit, employing a first protocol, with a communication network or a KMF unit 408 employing a second protocol. In accordance with an embodiment, the first protocol is a common air interface (CAI) OTAR, and the second protocol is a data link independent (DLI) or transport independent (TI) OTAR.

The signal flow 400 begins with a step of SU 402 sending 410 a common air interface (CAI) over the air rekeying (OTAR) message, associated with the first protocol. The CAI OTAR message may also be referred as a first protocol OTAR message in the below description. The CAI OTAR message includes at least a key management message (KMM) and a CAI header of the SU 402.

The signal flow 400 then moves to a step of the DG 406 creating 412 a KMM preamble and a DLI OTAR message when the first protocol of the SU 402 is different from the second protocol of the communication network or the KMF unit 408. The KMM preamble is created based on the CAI header information and configuration information of the SU. The DLI OTAR message is created utilizing information included in the received CAI OTAR message. The created DLI OTAR message includes the received KMM. Further, the created DLI OTAR message is encapsulated with the created KMM preamble so that the encapsulated DLI OTAR message appears to be associated with the second protocol.

The signal flow 400 then moves to a step of the DG 406 transmitting 414 the encapsulated DLI OTAR message having the KMM preamble to the KMF unit 408.

At the other end, the KMF unit 408 processes the received DLI OTAR message to provide a corresponding application service requested by the SU 402.

In the same way, the signal flow 400 describes the embodiment of CAI data registration process 416-424 and CAI unable-to-decrypt process 426-432 in the below description. It should be noted that the embodiments may be described in any order, and it is not limited to the order as shown in FIG. 4. Also, some embodiments, for example CAI data registration process 416-424, may be optional, and it need not be performed with other embodiments as depicted in FIG. 4.

Moving back to the steps of signal flow 400, the signal flow 400 describes the CAI data registration process 416-424. The signal flow 400 begins with a step of SU 402 sending 416 a CAI data registration request message to a base station or repeater 404. The CAI data registration request message notifies the base station or repeater 404 that a data registration process is in progress. The registration request message includes a CAI ID of the SU 402. In response to receiving the registration request message, the signal flow moves to a step of registration and context activation process 418 between the SU 402 and the DG 406 for determining an IP address, for the SU 402, associated with the second protocol.

The signal flow 400 then moves to a step of the DG 406 creating 420 a KMM preamble utilizing pre-configuration information of the SU 402. The pre-configuration information includes at least one of a manufacturer identity, an application key identity, and an algorithm identity.

The signal flow 400 then moves to a step of the DG 406 creating 422 a DLI OTAR registration message based on the received CAI data registration request message. The DLI OTAR registration message includes the received CAI address of the SU 402. The DLI OTAR registration message having the CAI address is then encapsulated with the created KMM preamble.

The signal flow diagram 400 then moves to a step of the DG 406 transmitting 424 the encapsulated DLI OTAR registration message to the KMF unit 408 that appears to be received from a SU 402 that the KMF unit 408 manages. Also, the KMF unit 408 binds or associates the CAI ID with an Internet protocol (IP) address of the SU 402 that is obtained during registration and context activation process 418 between the DG 406 and the SU 402.

In accordance with the embodiment, the signal flow diagram 400 describes the embodiment of CAI unable-to-decrypt process 426-432 in the below description. The signal flow 400 begins with a step of the SU 402 sending 426 a CAI unable-to-decrypt message to the DG 406 via the base station or repeater 404. The unable-to-decrypt message notifies a decryption failure at the SU 402. The CAI unable-to-decrypt message includes a CAI ID of the SU. In response to receiving the CAI unable-to-decrypt message, the signal flow 400 moves to a step of the DG 406 creating 428 a KMM preamble utilizing pre-configuration information of the SU 402. The pre-configuration information includes at least one of a manufacturer identity, an application key identity, and an algorithm identity.

The signal flow 400 then moves to a step of creating 430 a DLI OTAR unable-to-decrypt message based on the received CAI unable-to-decrypt message message. The DLI OTAR unable-to-decrypt message includes the received CAI address of the SU 402. The DLI OTAR unable-to-decrypt message having the CAI address is then encapsulated with the created KMM preamble.

The signal flow diagram 400 then moves to a step of transmitting 432 the encapsulated DLI OTAR unable-to-decrypt message to the KMF unit 408 that appears to be received from a SU that the KMF unit 408 manages.

Figure 5:
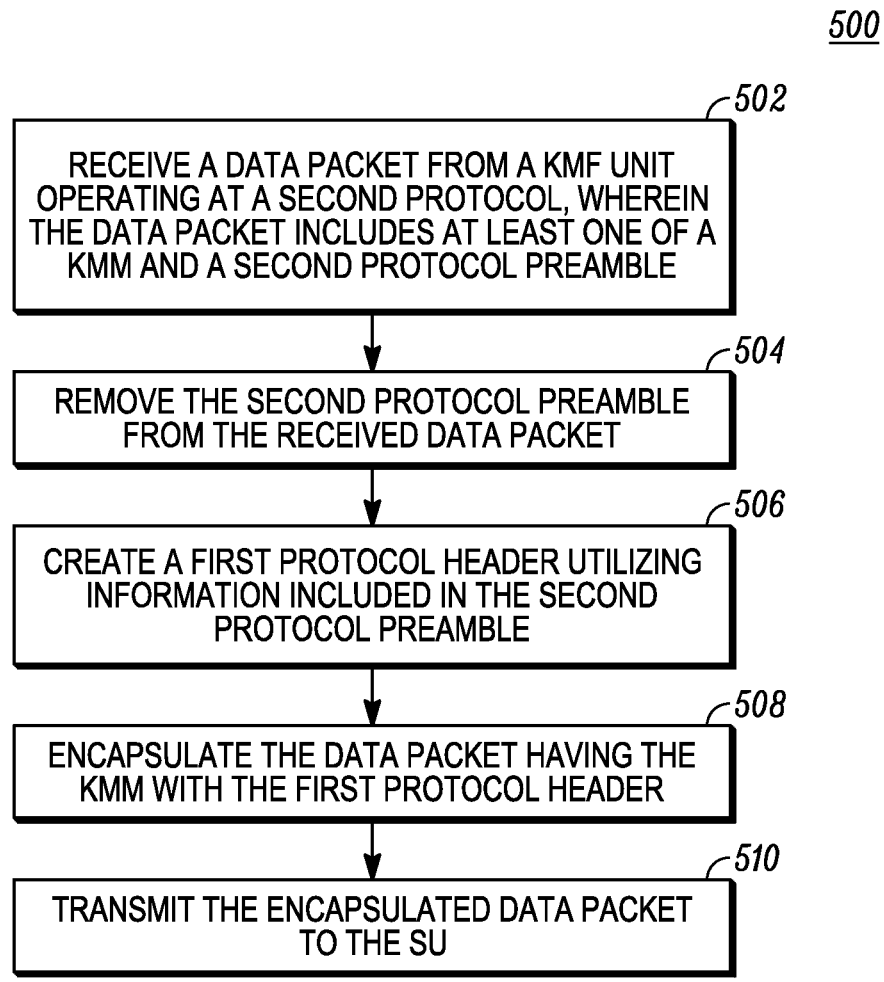
FIG. 5 is a flowchart representing a method for providing application service for a subscriber unit (SU) receiving data packets, associated with a second protocol, from a communication network employing a DLI OTAR protocol in accordance with some embodiments.

FIG. 5 discloses a method for providing for providing application service for a subscriber unit (SU) receiving data packets, associated with a second protocol, from a communication network employing a DLI OTAR protocol in accordance with some embodiments. The method 500 begins with a step of receiving 502 a data packet from a KMF unit 112 operating at the second protocol. The data packet includes at least one of a KMM message and a second protocol preamble e.g. KMM preamble. The method then moves to a step of removing 504 the second protocol preamble from the received data packet. The method continues with a step of creating 506 a first protocol header, e.g. CAI header, utilizing information included in the second protocol preamble and other SU configuration information. The DG transfers the information from the second protocol preamble to the first protocol header. The method then continues with a step of encapsulating 508 the data packet having the KMM with the first protocol header. The method finally moves to a step of transmitting 510 the encapsulated data packet to the SU 108 that appears to the SU 108 as a data packet received from the communication network 110 employing a first protocol. Therefore, a seamless application service is provided between the SU 108 and the KMF unit 112 irrespective of the protocol employed by the SU 108 and KMF unit 112. The seamless application service is provided by employing the APCO system 102 which provides translation/proxying service so that the end points such as the KMF unit 112 and the SU 108 can communicate with each other without knowing that they are using different protocols.

In accordance with the embodiment, the DG may also detect and process second protocol KMM messages inbound and outbound from subscriber units without modification as described above on different or the same channels as detecting and processing messages of the first protocol.

Figure 6:
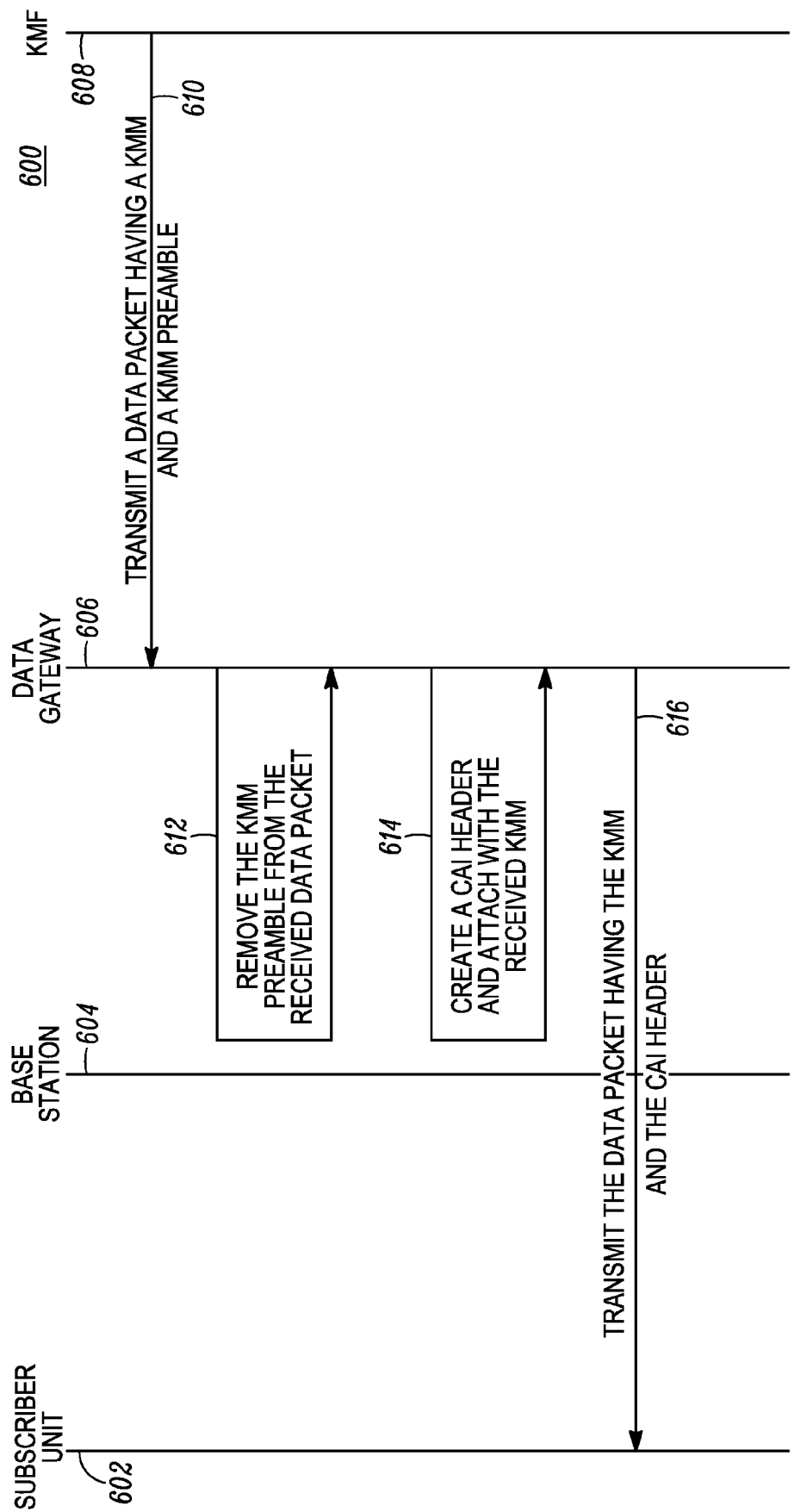
FIG. 6 is a signal flow diagram in accordance with some embodiments.

FIG. 6 discloses signal flow diagram for providing application service for a subscriber unit (SU) receiving data packets, associated with a second protocol, from a communication network employing a DLI OTAR protocol in accordance with some embodiments. The signal flow begins with a step of the KMF unit 608 transmitting 610 a data packet having a KMM and a KMM preamble to a DG 606. The data packet being transmitted to the SU 602 through the DG 606 and a base station or repeater 604.

The signal flow then moves to a step of the DG 606 removing 612 the KMM preamble from the received data packet. The data packet now includes only the KMM. The signal flow then continues with a step of the DG 606 creating 614 a CAI header utilizing the information included in the removed KMM preamble. The created CAI header is then attached to the data packet having the KMM.

The signal flow then continues with a step of the DG 606 transmitting 616 the data packet having the KMM and the attached CAI header to the SU. At the SU 602 end, the data packet appears to be associated with the first protocol and also appears to be received from the communication network employing the first protocol.

Thus, the invention provides multiple protocol application service support without multiple infrastructure devices. Further, the invention also provides simultaneous support of multiple protocols on a single channel and allows for slow migration of units being upgraded/moved/changed in the communication system from one protocol to another protocol.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized controllers (or "controlling devices") such as microcontroller, customized controllers and unique stored program instructions (including both software and firmware) that control the one or more controllers to implement, in conjunction with certain non-controller circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject.

Those skilled in the art will appreciate that the above recognized advantages and other advantages described herein are merely exemplary and are not meant to be a complete rendering of all of the advantages of the various embodiments of the present invention.

We claim:

1. A method for providing application service for a subscriber unit (SU), employing a first protocol, in a communication network employing a second protocol, the method comprising:

at a gateway, coupled to the communication network, providing an interface between the SU and a key management facility (KMF) unit, wherein the KMF unit is operating external to the communication network:

receiving a first protocol over the air rekeying (OTAR) message from the SU, wherein the first protocol OTAR message includes at least an application layer key management message (KMM), a first protocol header of the SU, and a first protocol address of the SU;

determining that the first protocol employed by the SU is different from the second protocol associated with the communication network based on the received first protocol OTAR message;

creating a second protocol preamble based on the first protocol header and configuration information of the SU;

creating a second protocol OTAR message by removing the application layer KMM from the received first protocol OTAR message and inserting the removed application layer KMM into the second protocol OTAR message, wherein the second protocol OTAR message includes the received first protocol address of the SU;

encapsulating the second protocol OTAR message with the created second protocol preamble; and sending the encapsulated second protocol OTAR message to the KMF unit operating at the second protocol.

2. The method of claim 1, wherein the first protocol OTAR message includes a common air interface (CAI) OTAR message requesting the application service from the KMF unit.

3. The method of claim 1, wherein the first protocol header includes a common air interface (CAI) header associated with the first protocol and the second protocol preamble includes a key management message (KMM) preamble associated with the second protocol.

4. The method of claim 1, wherein the second protocol OTAR message includes a data link independent (DLI) OTAR message.

5. The method of claim 1, wherein determining that the first protocol employed by the SU is different from the second protocol associated with the communication network based on information manually entered by an operator.

6. The method of claim 1 further comprising:

receiving a data packet from the KMF unit operating at the second protocol, wherein the data packet includes at least one of another KMM and another second protocol preamble;

removing the another second protocol preamble from the received data packet;

creating another first protocol header utilizing information included in the another second protocol preamble;

encapsulating the data packet having another KMM with the another first protocol header; and transmitting the encapsulated data packet to the SU.

7. The method of claim 1, wherein the first protocol includes at least one protocol that is based on common air interface (CAI) OTAR protocol, and the second protocol includes at least one protocol that is based on data link independent (DLI) OTAR protocol.

8. The method of claim 1, wherein the first protocol message includes at least one of a common air interface (CAI) data registration request message and a CAI unable-to-decrypt message and the first protocol address includes a common air interface (CAI) address (ID) of the SU.

9. The method of claim 1, wherein the second protocol OTAR message includes at least one of a data link independent (DLI) OTAR registration message and a DLI OTAR unable-to-decrypt message.

10. The method of claim 1, wherein the pre-configuration information of the SU includes at least one of a manufacturer identity, an application key identity, and an algorithm identity for creating the second protocol preamble.

11. The method of claim 1, wherein the first protocol address of the SU is included in the second protocol OTAR message so that the first protocol address is associated with an Internet protocol (IP) address of the SU at the KMF unit, the IP address being obtained during registration of the SU.

12. The method of claim 1, wherein a seamless application service is provided between the SU and the KMF unit irrespective of the protocol employed by the SU and the KMF unit.

13. The method of claim 6, wherein removing the another second protocol preamble from the received data packet enables decryption of the received data packet, thereby ensuring a seamless application service provision between the SU and the KMF unit.

14. The method of claim 1, wherein the second protocol preamble is created at an application layer of the gateway.

15. A communication system for providing application service for a subscriber unit (SU), employing a first protocol, in a communication network employing a second protocol, the communication system comprising:
  a data gateway (DG), coupled to the communication network, for interfacing between the SU and a key management facility (KMF) unit, wherein the KMF unit is operating external to the communication network;
  the data gateway for receiving a first protocol over the air rekeying (OTAR) message from the SU, wherein the first protocol OTAR message includes at least an application layer key management message (KMM), a first protocol header of the SU, and a first protocol address of the SU;
  the DG for determining that the first protocol employed by the SU is different from the second protocol associated with the communication network based on the received first protocol OTAR message;
  the DG for creating a second protocol preamble based on the first protocol header and configuration information of the SU;
  the DG for creating a second protocol OTAR message by removing the application layer KMM from the received first protocol OTAR message and inserting the removed application layer KMM into the second protocol OTAR message, wherein the second protocol OTAR message includes the received first protocol address of the SU;
  the DG for encapsulating the second protocol OTAR message with the created second protocol preamble; and
  the DG for sending the encapsulated second protocol OTAR message to the KMF unit operating at the second protocol.

16. The communication system of claim 15, wherein the first protocol OTAR message includes a common air interface (CAI) OTAR message requesting the application service from the KMF unit and the first protocol header includes a common air interface (CAI) header associated with the first protocol.

17. The communication system of claim 15, wherein the second protocol preamble includes a key management message (KMM) preamble associated with the second protocol and the second protocol OTAR message includes a data link independent (DLI) OTAR message.

18. The communication system of claim 15, wherein the first protocol message includes at least one of a common air interface (CAI) data registration request message and a CAI unable-to-decrypt message and the first protocol address includes a common air interface (CAI) address (ID) of the SU.

19. The communication system of claim 15 further comprising:
  the DG for receiving a data packet from the KMF unit operating at the second protocol, wherein the data packet includes at least one of another KMM and another second protocol preamble;
  the DG for removing the another second protocol preamble from the data packet; and
  the DG for creating another first protocol header utilizing information included in the another second protocol preamble;
  the DG for encapsulating the data packet having another KMM with the another first protocol header; and
  the DG for transmitting the encapsulated data packet to the SU.

20. The communication system of claim 15, wherein a seamless application service is provided between the SU and the KMF unit irrespective of the protocol employed by the SU and the KMF unit.

21. The communication system of claim 19, wherein the DG removing the another second protocol preamble from the received data packet enables decryption of the received data packet, thereby ensuring a seamless application service provision between the SU and the KMF unit.

22. The communication system of claim 15, wherein the second protocol preamble is created at an application layer of the DG.

23. A communication system, comprising:
  a subscriber unit (SU) employing a first protocol and having an internet protocol (IP) address associated therewith upon registration, the SU transmitting a common air interface (CAI) over the air rekeying (OTAR) message having an application layer key management message (KMM), a CAI header of the SU, and a first protocol address of the SU;
  an association of public safety communications officials (APCO) system providing interface between the SU and a key management facility (KMF) unit, the KMF unit operating external to the APCO system, the APCO system comprising:
    a base station receiving the CAI OTAR message from the SU; and
    a data gateway (DG) creating a key management facility (KMF) header, associated with the second protocol, based on the received CAI header and configuration information of the SU, for the SU when the first protocol is different from the second protocol, the DG creating a data link independent (DLI) OTAR message by removing the application layer KMM from the received CAI OTAR message and inserting the removed application layer KMM into the DLI OTAR message and further including the received first protocol address of the SU in the DLI OTAR message, the DG encapsulating the DLI OTAR message with the created KMF header, the DG sending the encapsulated DLI OTAR message to the key management facility (KMF) unit operating at the second protocol; and
  the KMF unit operating over the second protocol to provide application service to the SU based on the encapsulated DLI OTAR message.

24. The communication system of claim 23, wherein the KMF header is created at an application layer of the DG.

\* \* \* \* \*